May 21, 1968  H. S. BOONE  3,384,057
OPPOSED PISTON ENGINE

Filed Dec. 29, 1966  2 Sheets-Sheet 1

Henry S. Boone
INVENTOR.

BY *Clarence A. O'Brien*
*and Harvey B. Jacobson*
Attorneys

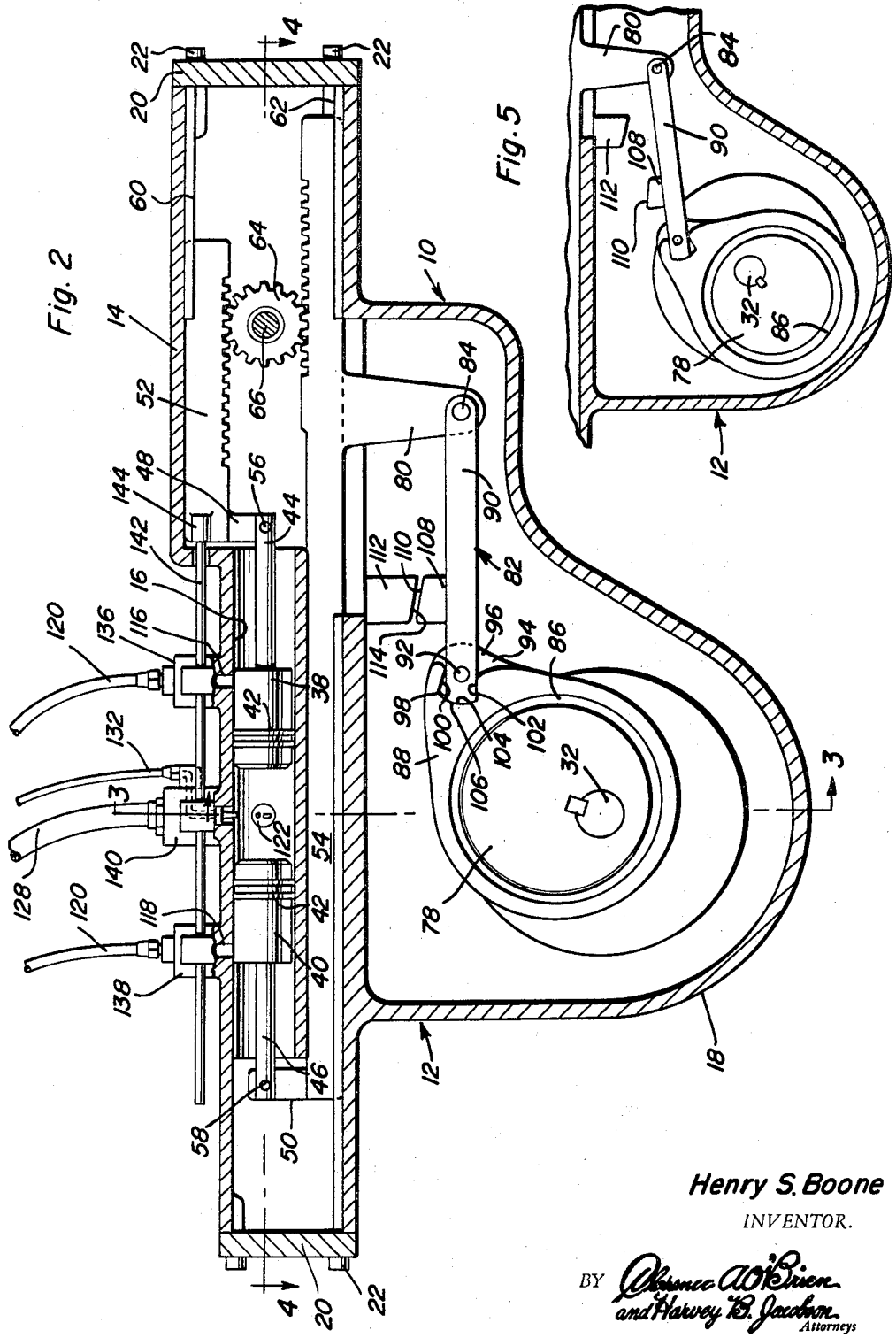

United States Patent Office 3,384,057
Patented May 21, 1968

3,384,057
OPPOSED PISTON ENGINE
Henry S. Boone, 10 High St., Montgomery, Ala. 36104
Filed Dec. 29, 1966, Ser. No. 605,747
6 Claims. (Cl. 123—51)

ABSTRACT OF THE DISCLOSURE

An opposed piston engine including rectilinearly reciprocal piston means and a rotating output shaft with mean operatively connected between the piston means and the output shaft for driving the shaft during movement of the piston means in one direction and through an effective crank arm angulated appreciably relative to the direction of initial driving forces transferred from the piston means to the rotatable shaft.

---

This invention relates to an opposed piston engine and more specifically to a novel driving connection between reciprocating piston means of the engine and the rotating output shaft of the engine.

The opposed piston engine includes a cylinder member in which a pair of opposed pistons are reciprocal for inverse movement and the pistons are interconnected for simultaneous inverse movement through a gear wheel meshed with confronting rack gear members connected to the pistons. One of the rack gear members is drivingly connected to the rotatable output shaft of the engine by means of the improved drive connection of the instant invention.

The main object of this invention is to provide a novel drive connection between a reciprocating member and a rotatable member for unidirectional rotation of the rotating member in response to reciprocation of the reciprocal member.

Another object of this invention in accordance with the immediately preceding object, is to adapt the novel drive connection for operatively connecting a reciprocating piston driven portion of a reciprocating piston engine to a rotatable output shaft of that engine.

Yet another object of this invention, in accordance with the preceding objects, is to adapt the novel drive connection for use in driving the rotatable output shaft of an internal combustion engine from reciprocating piston portions of that engine.

A final object of this invention to be specifically enumerated herein is to provide a novel drive connection which will conform to conventional forms of manufacture, be of simple construction and dependable in operation so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged fragmentary vertical sectional view taken substantially upon the plane indicated by the section line 2—2 of FIGURE 1;

FIGURE 5 is a fragmentary vertical sectional view similar to FIGURE 2 and on somewhat of a reduced scale illustrating different relative positions of the movable drive connection components of the engine.

Figure 3:
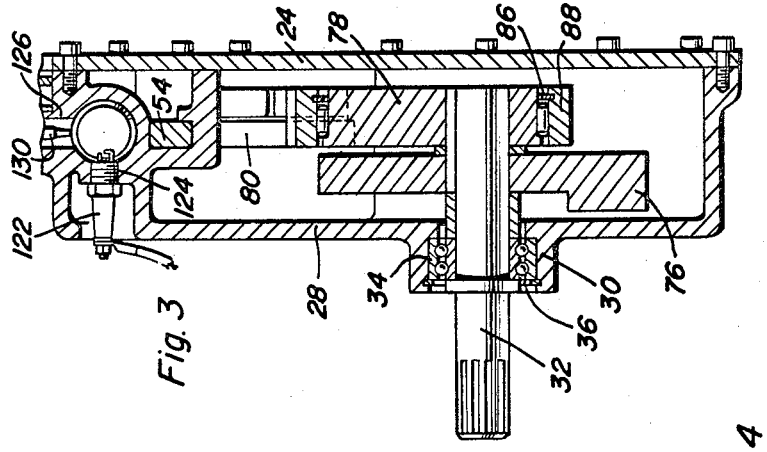
FIGURE 3 is a vertical sectional view taken substantially upon the plane indicated by the section line 3—3 of FIGURE 2.
Figure 4:
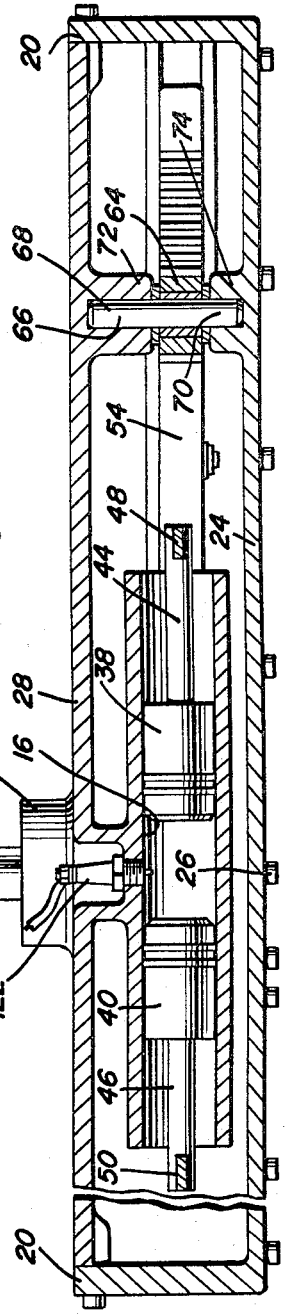
FIGURE 4 is a horizontal sectional view taken substantially upon the plane indicated by the section line 4—4 of FIGURE 2.
Figure 1:
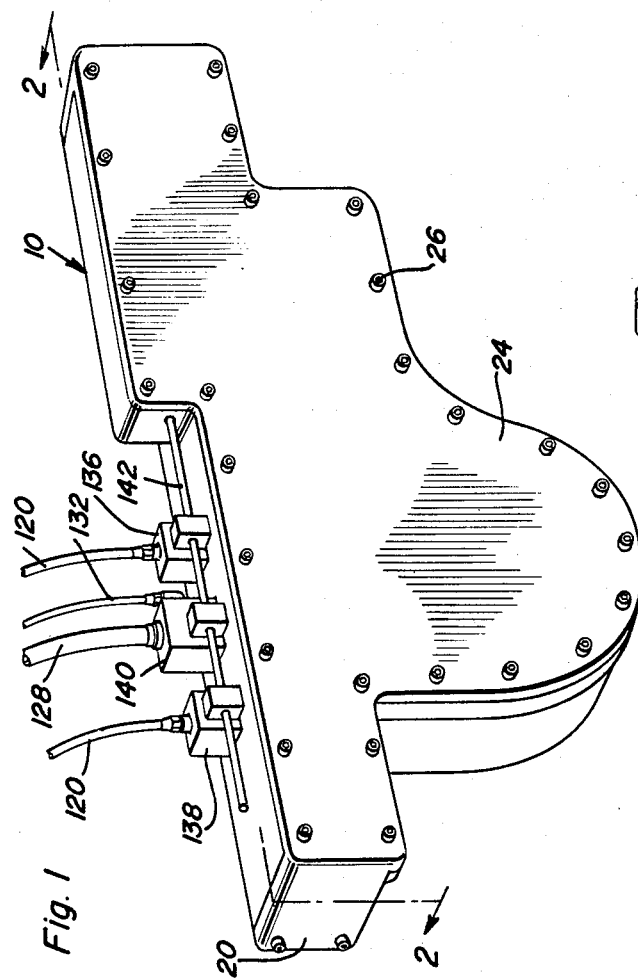
FIGURE 1 is a perspective view of an internal combustion engine constructed in accordance with the present invention.

With attention now invited more specifically to the drawings the numeral 10 generally designates an opposed piston internal combustion engine. The combustion engine 10 includes a one piece cylinder and crankcase assembly generally referred to by the reference numeral 12 including an upper horizontally elongated portion 14 in which a double ended cylinder bore 16 is defined and a lower crankcase defining portion 18. The opposite ends of the upper portion 14 are open and closed by means of removable end caps 20 secured in position by means of suitable threaded fasteners 22. Further, the assembly 12 includes a removable end or cover plate 24 secured in position over the correspondnig end of the assembly 12 by means of removable fasteners 26. The other end of the assembly 12 is closed by means of an integral end wall 28 including a journal boss 30 defining an opening into the interior of the assembly 12 from the exterior thereof, a rotatable output shaft 32 extendnig through the journal boss 30 and rotatably journaled therethrough by means of a bearing assembly 34 removably secured therein by means of a retaining ring 36.

A pair of opposing pistons 38 and 40 are reciprocally disposed within the bore 16 and include suitable piston rings 42. The pistons 38 and 40 include oppositely extending piston rods 44 and 46 whose remote ends are pinned to attaching lugs 48 and 50 carried by coacting rack gears 52 and 54 as at 56 and 58, respectively. The rack gears 52 and 54 are guidingly reciprocally supported from guide structures 60 and 62 defined in the upper portion 14 and are interconnected for simultaneous inverse rectilinear reciprocation by means of a gear wheel 64 journaled on a shaft 66 whose opposite end portions 68 and 70 are supported in suitable mounting bosses 72 and 74 carried by the end wall 28 and the closure or cover plate 24, respectively.

The output shaft 34 has a flywheel 76 mounted thereon for rotation therewith and also an eccentric rotating journal portion 78, the rack gear 54 includes a depending mounting lug 80 and a connecting rod assembly generally referred to by the reference numeral 82 has one end pivotally secured to the mounting lug or arm 80 as at 84 and the other end journaled on the eccentric journal portion 78 by means of a roller bearing assembly 86.

The connecting rod assembly 82 includes a first end section 88 and a section end section 90. The ends of the sections 88 and 90 remote from the eccentric journal portion 78 and the pivot connection 84 are pivotally connected by means of a pivot pin 92. The section 88 includes a radially outwardly projecting mounting portion 94 relieved as at 96 and including a recess 98 provided with first and second abutment surfaces 100 and 102 interconnected by means of a bearing surface 104. The bearing surface 104 is partial cylindrical and has as its center of curvature the longitudinal center of the pivot fastener or pin 92. In addition, the adjacent end face 106 of the end section 90 is also partial cylindrical and has the longitudinal center axis of the pivot pin 92 as its center of curvature.

Therefore, any thrusts applied to the section 90 to urge the latter to the left as viewed in FIGURES 2 and 5 of the drawings will in part be transmitted to the end section 88 through the pivot fastener 92 and in part through contact of the end face 106 of the section 90 abutting the bearing surface 104.

The section 90 includes an abutment block 108 including an inclined abutment surface 110 and the upper portion 14 includes a depending abutment block 112 including a similarly inclined abutment or cam surface 114.

The upper portion 14 includes a pair of air inlets 116 and 118 opening into the cylinder bore 16 and communicated with any suitable source (not shown) of air under pressure by means of pressure hoses 120. In addition, a spark plug 122 is threadedly engaged in a threaded bore 124 formed in the upper portion 14 and opening into the center of the cylinder bore 16 between the pistons 38 and 40. Still further, the upper portion 14 includes an exhaust passage 126 opening into the center of the cylinder bore 16 and having an outlet pipe 128 operatively associated therewith.

In addition to compressed air being delivered into the cylinder bore 16 through the air inlets 116 and burned exhaust gases being dischargeable from the cylinder bore 16 through the exhaust passage 126 and the outlet pipe 128, a fuel injection nozzle 130 is disposed in the passage 126 and has a liquid fuel supply line 132 operatively connected thereto. The inlet end of the fuel supply line 132 may be operatively communicated with any suitable source (not shown) of fuel under pressure such as a supply of fuel under constant pressure or an injection pump operable to supply fuel to the injector nozzle 130 in timed sequence with the speed of rotation of the output shaft 32.

The air inlets 116 and 118 may have air control valve assemblies 136 and 138 operatively associated therewith. Still further, the exhaust passage 126 has an exhaust control valve assembly 140 operatively associated therewith and a longitudinally reciprocal valve assembly actuating control rod 142 is operatively connected to the rack gear 52 as at 144 and to the control valve assembly 140 for timed actuation of the latter during reciprocation of the rack gears 52 and 54. Still further, if the control valve assemblies 136 and 138 are utilized, the rod 142 may also be operatively associated therewith for their actuation in timed sequence with reciprocation of the rack gears 52 and 54.

In operation, and assuming the movable portions of the engine 10 to be positioned as illustrated in FIGURE 2 of the drawings and that a combustible mixture of air and fuel is disposed within the cylinder bore 16 between the pistons 38 and 40, actuation of the spark plug 122 will cause the combustible air and fuel mixture to be ignited. The energy within the energized gases within the center portion of the cylinder bore 16 will force the pistons 38 and 40 apart and thus the rack gear 54 will be shifted to the left as viewed in FIGURE 2 of the drawings thereby urging the second section 90 of the connecting rod assembly 82 longitudinally toward the left. Inital movement of the second end section 90 to the left will cause slight rotation of the end section 88 relative to the journal portion 78 in a counterclockwise direction and thus upward swinging movement of the adjacent end of the end section 90 thereby causing the surfaces 110 and 114 to be disposed in sliding contacting relation with each other. Thereafter, continued thrust on the end section 90 to the left by the rack gear 54 will be directed upon the eccentric journal portion 78 and thus cause the shaft 32 to rotate in a counterclockwise direction. After the journal portion 78 has been angularly displaced approximately 30° and for approximately 90° of further angular displacement thereof, the rod 142 will actuate the control valve assembly 140 and thus vent the exhaust gases within the cylinder bore 16 between the pistons 38 and 40 to the ambient atmosphere through the outlet pipe 128. Continued counterclockwise angular displacement of the eccentric journal portion 78 toward the position thereof illustrated in FIGURE 5 of the drawings is effected by further movement of the pistons 38 and 40 apart in a manner uncovering the inlet ports or passages 116 and 118 whereupon air under pressure is admitted into the cylinder bore 16 between the pistons 38 and 40, the uncovering of the ports 116 and 118 by the pistons 38 and 40 being sufficient timing action of the inlet of fresh air into the cylinder bore 16 although the control valve assemblies 136 and 138 may be utilized if desired.

As soon as the journal portion 78 is angularly displaced to the position thereof illustrated in FIGURE 5 of the drawings the pistons 38 and 40 are spaced their maximum distances apart and the flywheel 76, by inertia, causes further counterclockwise rotation of the shaft 32 and thus exerts a force on the end section 90 to urge the rack gear 54 toward the right as viewed in FIGURE 2 of the drawings so as to move the pistons 38 and 40 back toward each other, which movement of the pistons will sequentially cover and thus close the air inlet ports 116 and 118 and compress the fresh air charge between the pistons 38 and 40 until such time as the journal portion 78 is angularly displaced to a position rotated approximately 180° in a counterclockwise direction from the position thereof illustrated in FIGURE 5 of the drawings to the position thereof illustrated in FIGURE 2 of the drawings. In addition to the compression of air during such rotational displacement of the journal 78 aforementioned such motion of such journal 78 will have caused rotation of member 88 clockwise in relation to pin 92 with continuous pressure on bearing surface 104 on end facing 106, contact and seating of abutment surface 110 against abutment surface 114, and contact of a portion of the lower edge of 90 below end facing 106 and adjacent thereto with abutment surface 102.

As soon as the section 90 is shifted to the left from the position thereof illustrated in FIGURE 2 of the drawings during the next cycle of operation of the engine 10 sufficient to slide the surface 110 off of the left end of the surface 114, the end of the section 90 remote from the pivot connection 84 is allowed to swing upwardly so as to engage the abutment surface 100. Of course, as the pistons 38 and 40 are slowed during their final movement apart during the last of the air inlet phase of operation of the engine 10 previously described, the inertia of the pistons 38 and 40 as well as the rack gears 52 and 54 exert a pull on the end section 90 at the pivot connection 84 and the end of the section 90 adjacent the section 88 is at this point shifted from engagement with the abutment surface 100 into engagement with the abutment surface 102 due to relative angular displacement of the end sections 88 and 90.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An opposed piston engine comprising a housing having an elongated cylinder comprising a combustion chamber, a power output shaft journaled from said housing for rotation about an axis disposed at generally right angles to and spaced laterally of said cylinder, said shaft including an eccentric rotating journal portion, opposed power pistons reciprocally positioned within said combustion chamber, a piston synchronizing means comprising a pair of laterally spaced guides associated with said housing, a gear mounted for rotation on said housing between said guides, a rack element reciprocally positioned on each guide, each of said rack elements having a rack portion in meshing engagement with said gear, connecting rod means connecting at least one of said rack elements to said eccentric rotating journal portion.

2. The combination of claim 1 wherein said connecting rod means is elongated and journaled at one end from said journal portion and oscillatably supported at its second end from said one rack element, said connecting rod including first and second end aligned end sections whose remote ends define said one end and said second end, respectively, and whose adjacent ends are pivotally connected together for limited relative oscillation about an axis paralleling the first mentioned axis.

3. The combination of claim 2 wherein said end sections are pivotally secured together for a maximum of relative oscillation of approximately fifteen degrees of angular displacement.

4. The combination of claim 2 wherein said end sections are pivotally secured together for oscillation relative to each other between major and minor limit positions of angular displacement inclined generally forty-five and sixty degrees relative to each other, respectively.

5. The combination of claim 4 wherein said second end section generally parallels said path of movement when said one rack element is disposed adjacent one limit position of its reciprocal movement.

6. The combination of claim 5 including means stationarily positioned relative to said housing, said stationary means and said second end section including coacting means operative to cause said sections to oscillate toward their minor angularly related positions upon movement of said one rack element to said one limit position and to prevent full oscillatory movement of said sections toward their major angularly related positions until said one rack element has moved a predetermined amount from said one limit position thereof toward the other limit position thereof.

References Cited

UNITED STATES PATENTS

| | | | |
|---|---|---|---|
| 2,381,465 | 8/1945 | Schroder | 123—5 |
| 2,823,653 | 2/1958 | Dildine | 123—4 |

WENDELL E. BURNS, *Primary Examiner.*